(12) United States Patent
Shakya et al.

(10) Patent No.: US 9,504,061 B2
(45) Date of Patent: Nov. 22, 2016

(54) NETWORKED RESOURCE PROVISIONING SYSTEM

(71) Applicants: British Telecommunications Public Limited Company, London (GB); Khalifa University of Science, Technology and Reasearch, Abu Dhabi (AE); Emirates Telecommunications Corporation, Abu Dhabi (AE)

(72) Inventors: Sid Shakya, London (GB); Gilbert Owusu, London (GB); Beum Seuk Lee, London (GB); Dymitr Ruta, Abu Dhabi (AE); Kin Poon, Abu Dhabi (AE); Okung Ntofon, London (GB)

(73) Assignees: British Telecommunications PLC, London (GB); Khalifa University of Science, Technology and Research, Abu Dhabi (AE); Emirates Telecommunications Corporation, Abu Dhabi (AE)

( * ) Notice: Subject to any disclaimer, the term of this patent is extended or adjusted under 35 U.S.C. 154(b) by 0 days.

(21) Appl. No.: 14/927,781

(22) Filed: Oct. 30, 2015

(65) Prior Publication Data
US 2016/0128083 A1 May 5, 2016

(30) Foreign Application Priority Data
Oct. 31, 2014 (EP) .................................. 14275225

(51) Int. Cl.
*H04L 12/28* (2006.01)
*H04M 11/00* (2006.01)
*H04W 72/12* (2009.01)
*H04W 72/04* (2009.01)
*H04M 15/00* (2006.01)
*G06F 9/50* (2006.01)

(52) U.S. Cl.
CPC ........ *H04W 72/1263* (2013.01); *G06F 9/5072* (2013.01); *H04M 15/8027* (2013.01); *H04W 72/0446* (2013.01); *H04W 72/0486* (2013.01); *G06F 2209/506* (2013.01); *G06F 2209/5014* (2013.01)

(58) Field of Classification Search
CPC .......................... H04L 67/10; H04W 72/0453
USPC ........... 455/406; 370/395.4, 310.2, 404, 397, 370/431, 236, 253
See application file for complete search history.

(56) References Cited

U.S. PATENT DOCUMENTS

| 6,563,829 | B1 * | 5/2003 | Lyles | H04L 12/2801 370/230 |
| 8,849,779 | B2 * | 9/2014 | Das | G06F 17/30896 707/696 |
| 9,414,216 | B1 * | 8/2016 | Harrington | H04W 4/26 |

*Primary Examiner* — Kiet Doan
(74) *Attorney, Agent, or Firm* — Calfee, Halter & Griswold LLP (57) ABSTRACT

In response to requests for their use of the resources by the applications, resources are first allocated to "inelastic" requests specified for performance at a specific time slot. A baseline allocation of resources is then determined which is the minimum amount of capacity that has to be used for efficient operation of the resources required to meet the requests. This baseline will include some additional capacity as the minimum efficient capacity is less than the maximum capacity. "Elastic" requests, specified for performance within a predetermined time range comprising two or more of the set of time slots, are then allocated so as to prioritize the use of this spare capacity, bringing actual usage up to at least the baseline allocation of resources. If further capacity is required to meet all the inelastic requests, further capacity is allocated and the baseline redefined to include it.

19 Claims, 10 Drawing Sheets

NETWORKED RESOURCE PROVISIONING SYSTEM

CROSS REFERENCE TO RELATED APPLICATIONS

The present application is a Paris Convention filing of, and claims priority under 35 U.S.C. §119 to, EPO Application No. EP 14275225.2, filed on 31 Oct. 2014, the entire disclosure of which is fully incorporated herein by reference as though fully set forth herein.

FIELD OF THE INVENTION

This invention relates to allocation and provisioning of resources in a telecommunications network.

BACKGROUND OF THE INVENTION

The cloud paradigm has emerged as a key enabler for various sectors of industry. Benefits such as cost reductions, flexibility, and scalability continue to increase demands for cloud-based services with forecasts predicting that global cloud and datacentre traffic will increase nearly four-and-a-half-fold and three-fold respectively within the next five years. Global cloud and datacentre traffic are expected to reach 5.3 and 7.7 zettabytes (1 $zB=10^{21}$ Bytes) respectively by 2017, which is more than five times forecasted global internet protocol traffic for the same period. The mitigation of congestion and efficient utilisation of available resources will become increasingly important as the volume of such traffic increases, and as networked applications become more demanding of data capacity and computing power.

Usage-based pricing has become a common approach for managing demand for networked applications and services using wireless and mobile communications. With usage-based pricing, a service provider offers different capacity allowances (resource and/or data capacity) at fixed prices and a customer agrees to a service level agreement specifying a maximum capacity allowed within a specific time period. This approach usually includes a relatively high fee for exceeding this capacity allowance. Such fees deter customers from exceeding capacity allowances specified in their service level agreements, but do not prevent multiple customers from simultaneously accessing available computation, storage, and network resources, causing congestion at times of peak demand. If a service provider makes available computation, storage, and network resources sufficient to effectively mitigate congestion during peak periods, these resources will be under-utilised for much of the time, resulting in low resource utilization and high cost of providing resources during off-peak periods in excess of the traffic on offer at those times.

Time-dependent pricing is an emerging alternative to usage-based pricing and is based on the concept that customers are offered prices which are computed using not only capacity allowances but also taking into consideration the state of the networked infrastructure when services are to be delivered to customers. Service providers aim to offer relatively lower prices during off-peak periods and incentivise customers to move their demands for networked services to less congested periods. This movement of demand allows a reduction in the volume of resources that are required, as congestion during peak periods is distributed to less congested periods; this in turn will lead to increased resource utilization during off-peak periods and reductions in the cost per user of operating resources during those off-peak periods. It can also allow delivery of networked services to customers whose demands could have been blocked, or who experience signal quality impairment, due to insufficient resource during peak periods.

It is known to provide time-dependent prices for mobile Internet customers; however, these systems merely provide an incentive to a user to decide when to use, or refrain from using, the network resources by imposing a price penalty of peak rate use to encourage the user to operate at cheaper, less busy, times. There is no dynamic placement of computing and storage services. Any change in operational time is entirely under the control of the user, influenced by the pricing system, and there is little opportunity to fine-tune the system to optimise the usage of the resources beyond a few simple and non-dynamic tariff bands that can be readily understood by the users.

It is desirable to use time-shifting to automatically flatten the temporal demand fluctuation between peak and off-peak periods, increasing overall resource utilization, and maximize the efficiency with which those resources are used. The ability to automatically make intelligent decisions on network path selection, computing capability and storage placements in addition to dynamically generating time-dependent prices allows a more optimized end-to-end solution Applications which are interactive, or require real-time delivery of transactional networked services, are time-critical and cannot be shifted. For this class of applications, the principal QoS (Quality of Service) requirements are response time and throughput. Time-shifting can be applied to customer applications that are time-elastic (i.e. delay-tolerant) requests for non-interactive and non-critical networked services, such as cloud-based services for data synchronization (updating a duplicate data store to match a master data store), data archiving, machine-to-machine (M2M) applications such as networked sensors and meters, and applications for scientific simulations and modelling. The principal quality requirements for such customer applications are not time-dependant and this enables time shifting from peak periods to less congested periods within the acceptable tolerance limits.

SUMMARY OF THE INVENTION

An exemplary aspect of the invention provides a process for scheduling the allocation of resources to applications in response to requests for use of the resources by the applications, the requests including inelastic requests specified for performance at a specific time slot, and elastic requests specified for performance within a predetermined time range comprising one or more of a set of time slots, and resources being capable of allocation in predetermined blocks, characterised in that for each of the set of time slots a baseline resource capacity is determined, being the minimum block of capacity that can be allocated that is efficient to meet inelastic requests specified for performance within that time slot, and the elastic requests are allocated for performance such that the total capacity allocated is maintained at least as great as the baseline capacity. The specification of a baseline capacity defines a minimum capacity below which utilisation should not be allowed to fall. The predetermined time range may be specified in terms of a scheduling elasticity, defining limits of when the resources may be allocated. Requests may specifying a fixed time (i.e. a range of zero) are referred to in the specification as "inelastic". Other requests may specify a time range with one or more fixed parameters, such as "not before" or "not after" a certain time.

In another exemplary aspect of the invention, there is provided a resource provisioning system comprising a scheduler arranged to perform the process defined above. The resource provisioning system may comprise a forecasting engine configured to generate a value for the baseline resource capacity to be used by the scheduler, and a utilisation repository for storing data generated by the scheduler, and to be used by the forecasting engine. It may also comprise a resource pricing system arranged to assign a value to each request, the value being associated with the resources required to meet each request relative to the baseline resource capacity.

BRIEF DESCRIPTION OF THE FIGURES

An embodiment of the invention will now be described, by way of example, and with reference to the Figures, in which.

DETAILED DESCRIPTION

According to the invention, in a first aspect there is provided a process for scheduling the allocation of resources to applications in response to requests for use of the resources by the applications, the requests including inelastic requests specified for performance at a specific time slot, and elastic requests specified for performance within a predetermined time range comprising one or more of a set of time slots, and resources being capable of allocation in predetermined blocks, characterised in that for each of the set of time slots a baseline resource capacity is determined, being the minimum block of capacity that can be allocated that is efficient to meet inelastic requests specified for performance within that time slot, and the elastic requests are allocated for performance such that the total capacity allocated is maintained at least as great as the baseline capacity. The specification of a baseline capacity defines a minimum capacity below which utilisation should not be allowed to fall. The predetermined time range may be specified in terms of a scheduling elasticity, defining limits of when the resources may be allocated. Requests may specifying a fixed time (i.e. a range of zero) are referred to in the specification as "inelastic". Other requests may specify a time range with one or more fixed parameters, such as "not before" or "not after" a certain time.

In one embodiment the baseline capacity is determined by calculation of the minimum resources projected to be required to meet the inelastic requests in a predetermined period when averaged over that period. As the resources are allocatable in blocks, this baseline figure will in general be greater than the actual capacity required by the inelastic requests. The elastic requests are allocated such as to use the spare capacity represented by this difference to bring the utilisation up to the level above which it is efficient to operate. For example, the income derived from operating the resource should not be less than the cost of operating it. This maximises the use of the baseline resources, so that further blocks of resource are not dedicated to meeting requests until the baseline capacity is all allocated.

In one embodiment each request is identified as to whether the respective predetermined time range falls partially within a period where the total volume of requested capacity does not exceed the capacity available, and allocating the application to resources for use during that period. This allows requests whose specified time range spans both a "peak" period where demand exceeds capacity and a "non-peak" period to be allocated to the latter.

In the embodiment to be described each request is allocated resources at the earliest point in its requested time range at which the other conditions of allocation are met. This minimises the possibility that the earliest timeslots will expire without being used, resulting in possible overloading of resources in a later timeslot.

The resources to be allocated may include data storage capacity, computational capacity, or telecommunications network capacity. In the latter case, in the event of multiple routes being available, it is preferable for the default selection to be to assign the shortest available network path to the application. The shortest path may be specified in terms of propagation time or number of hops, Selection may also take into account other quality metrics such as data loss rate and latency In another aspect of the invention, there is provided a resource provisioning system comprising a scheduler arranged to perform the process defined above. The resource provisioning system may comprise a forecasting engine configured to generate a value for the baseline resource capacity to be used by the scheduler, and a utilisation repository for storing data generated by the scheduler, and to be used by the forecasting engine. It may also comprise a resource pricing system arranged to assign a value to each request, the value being associated with the resources required to meet each request relative to the baseline resource capacity.

The scheduling system optimises the use of resources by rescheduling work to match supply and demand of resources. It leverages this correlation to execute a scheduling algorithm (i.e. a joint network traffic routing, and compute and storage service placement algorithm) which automatically time-shifts the delivery of network services, and configures network paths, compute nodes, and storage servers in a manner that guarantees that at least the minimum resource capacities are provisioned and utilised during both peak and off-peak periods.

In particular work can be scheduled so that a resource is either used close to its maximum or not at all, so that an expensive resource does not have to kept running at a time of low demand. This allows a closer correlation between the costs of operating the resources and the prices offered to customers on the one hand, and on the other hand the minimum resource capacities which must be provisioned for the service provider to operate cost-effectively during less congested periods.

Figure 1:
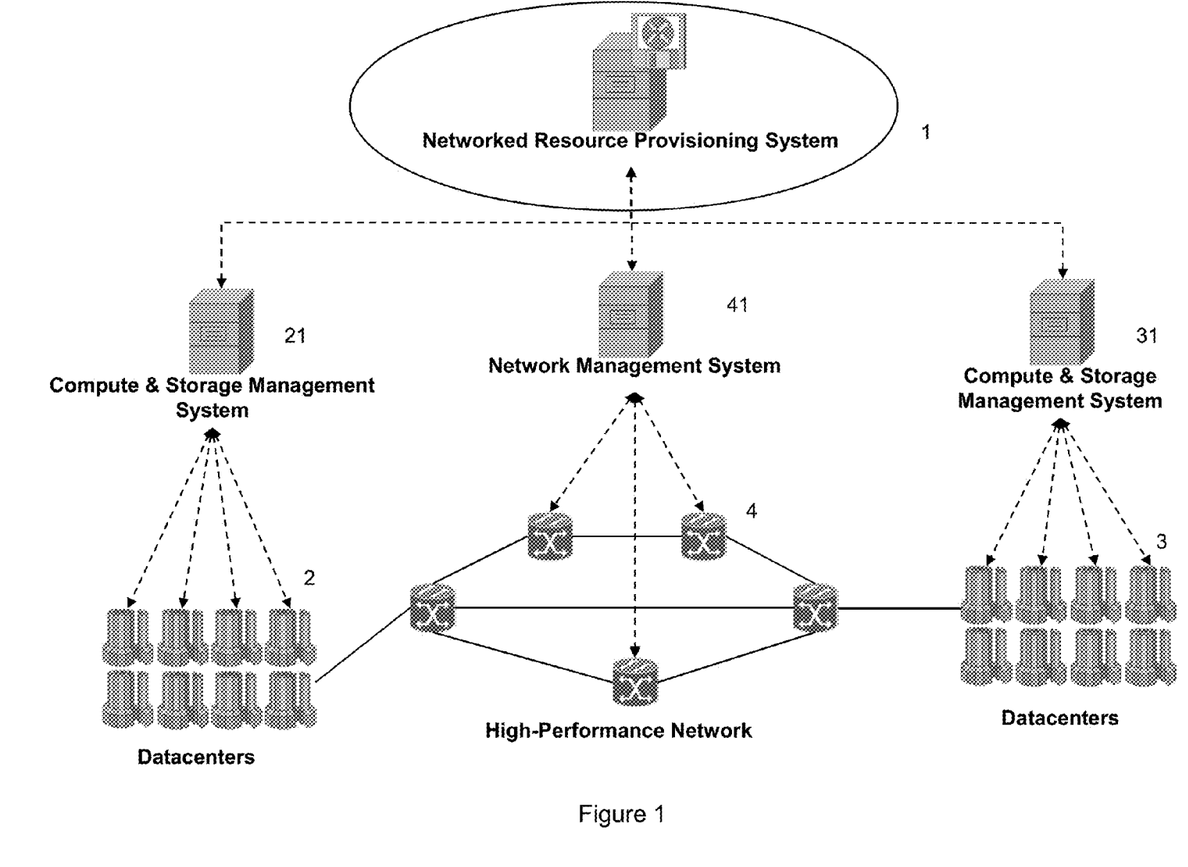
FIG. 1 is a representative architecture of a networked infrastructure interacting with a Networked Resource provisioning system operating according to the invention.

FIG. 1 depicts the architecture of a networked infrastructure for enterprise cloud and datacentre applications and services, operating with a networked resource provisioning system (NRPS) 1 according to the present invention. The underlying networked infrastructure comprises high performance compute and storage resources 2, 3 which are interconnected via a high capacity communications network 4. These resources 2, 3, 4 are controlled and managed via respective resource management systems 21, 31, 41 which provide the NRPS 1 with resource status information and dynamically provision resources according to service delivery information received from the NRPS 1. The main functions of the NRPS include: dynamic computation of prices for customers to utilize enterprise cloud and datacentre infrastructures during peak and off-peak periods, automatic resolution of requests from customer applications to identify time elastic demands and time-shift these demands during congested peak periods, and dynamic scheduling of customer demands to maximise the use of any resources that have already been partially allocated to meet inelastic demands, rather than incurring additional costs by allocating further resources at other times, even if they may be closer to the closer to a target time for the elastic demands. In particular, the marginal cost of allocating a resource to meet one or more elastic demands should not exceed the benefit (income) gained by meeting that demand.

Figure 2:
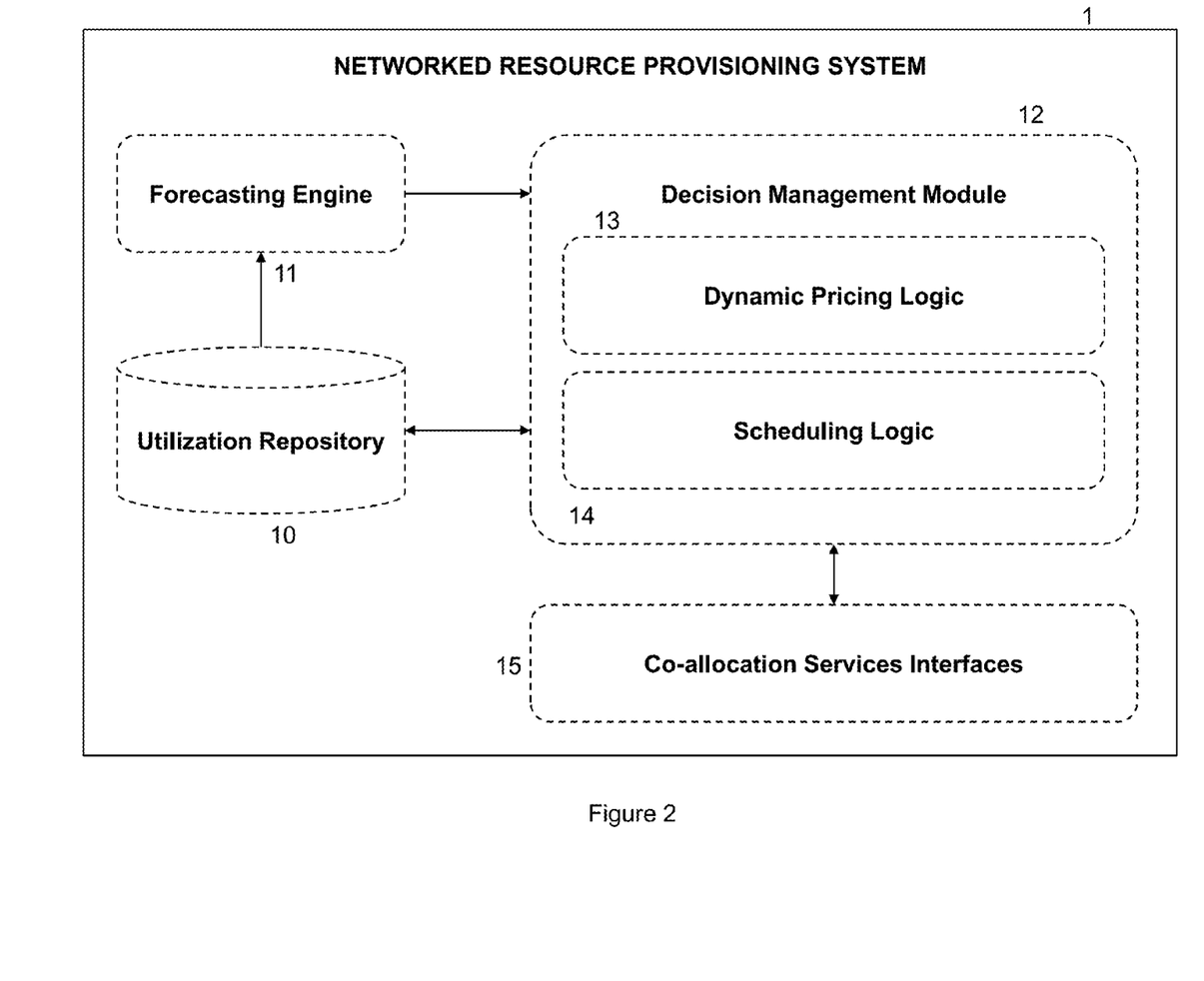
FIG. 2 is a Schematic diagram of the functional elements of the Networked Resource Provisioning System depicted in FIG. 1.

FIG. 2 is a schematic diagram of the functional elements of a Networked Resource Provisioning System.

A Utilization Repository 10 maintains status information about the compute, storage, and network resources 2, 3, 4 in the cloud and datacentre infrastructures. This information is used for real time scheduling of customer demands. This component maintains a historical view of resource utilization which is used by the NRPS to dynamically forecast peak and off-peak periods, and also expected customer demands for time elastic and time inelastic networked services.

A forecasting engine 11 processes historical information stored in the Utilization Repository 10 to identify significant factors such as operating costs, peak or off-peak times, and offered prices, which could affect resource utilization in the enterprise cloud and datacentre infrastructures 2, 3, 4. The NRPS 1 uses this component to generate a conceptual model representing expected resource utilization profiles taking into consideration existing correlations between identified significant factors.

A Decision Management Module 12 controls the other elements, and provides two inter-dependent operations. A dynamic pricing logic 13 uses resource utilization models generated by the Forecasting Engine 11 to dynamically generate varying prices for peak and off-peak periods. It is arranged to determine that time-dependent prices offered by service providers offset the cost of operating resources, and in particular generates discounted rates for networked services to customers during less congested periods. The NRPS 1 automatically determines the baseline resource capacities that must be provisioned to deliver networked services that generate sufficient revenue to offset the aforementioned operating costs during less congested periods.

A key requirement for the integration of time-dependent pricing is for an advance notification of prices for peak and off-peak periods to be published to all customers. The NRPS achieves this by dynamically generating service level specifications and notifying clients of the rates to be offered in both the short term (days to weeks) and long term (weeks to months) notifications.

The Decision Management Module 12 also has scheduling logic 14 which processes each individual service request from customer applications, and classifies these requests into time elastic and time inelastic, and schedules the processing in such a way as to flatten the temporal demand fluctuation between peak and off-peak periods by time-shifting the delivery of networked services for delay-tolerant customer applications from congested peak periods to less congested periods. It houses operating costs-aware scheduling logic which automatically schedules customer application requests such that resources allocated by the NRPS to deliver networked services do not operate below the baseline resource capacities required to generate revenue that offsets the operating costs incurred by Service providers.

The decision management module 12 interacts with the resource management systems 21, 31, 41 through a co-allocation Service Interface 15 which co-ordinates allocation of the different resource types in the infrastructure e.g. computing, storage, and network, so as to concurrently provision multiple resource types, for example for example to ensure that storage is made available in time to accept the results of a computation.

Figure 3:
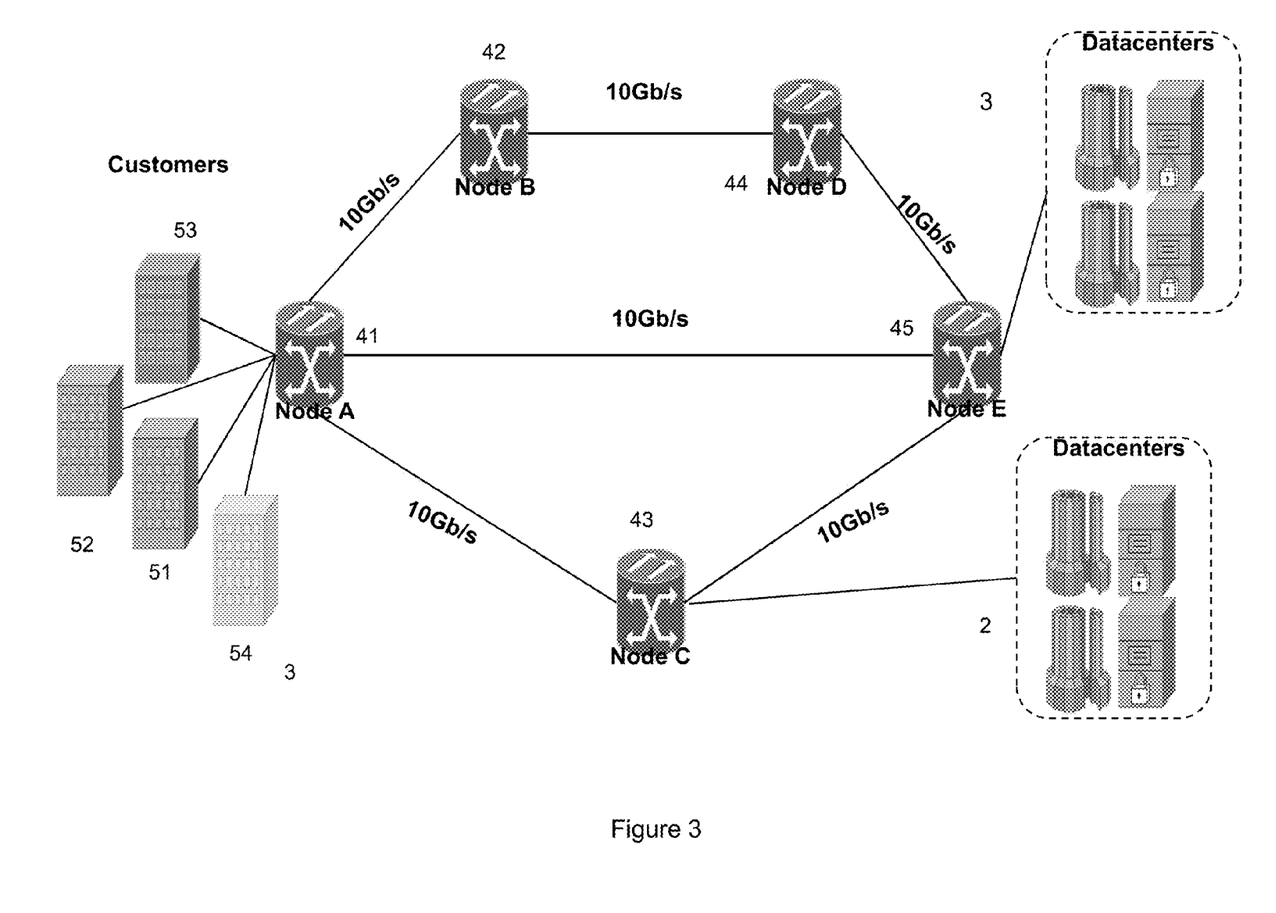
FIG. 3 is a simplified representation of a networked infrastructure.

FIG. 3 depicts a simplified networked infrastructure 4 for an enterprise cloud and datacentre 3 delivering data to and from customers 2. For simplicity, this example only focuses on the provisioning of network resources 4—specifically bandwidth of the high capacity network which comprises nodes 41, 42, 43, 44, 45 interconnected via 10 Gbps links. Similar principles would apply to provisioning of data resources 2, 3.

Again for simplicity only customers connected to the network to one specific node 41 and accessing data centres connected to another specific node 45 are considered in this illustration.

Table 1 presents an example of time-dependent prices which might be generated by the pricing logic 13 for the delivery of networked services during peak and off-peak periods. Table 1.0 also presents the assumed operating costs the service provider incurs for provisioning resources in the networked infrastructure depicted in FIG. 3. These time-dependent prices and operating costs have been simplified for the purpose of describing the applicability of this invention. This is a simplified embodiment to illustrate the principle of the invention. Generally, the system would consider more parameters and generate more complex varying prices and operating costs for peak and off-peak periods.

TABLE 1

Time-dependent Prices and Operating Expenditures

| Time-dependent Network Prices | |
|---|---|
| Peak periods | 0.950 per Gbps |
| Off-peak periods | 0.650 per Gbps |

| Operating Expenditures | |
|---|---|
| Power (per node) | 0.450 per timeslot |

Figure 4:
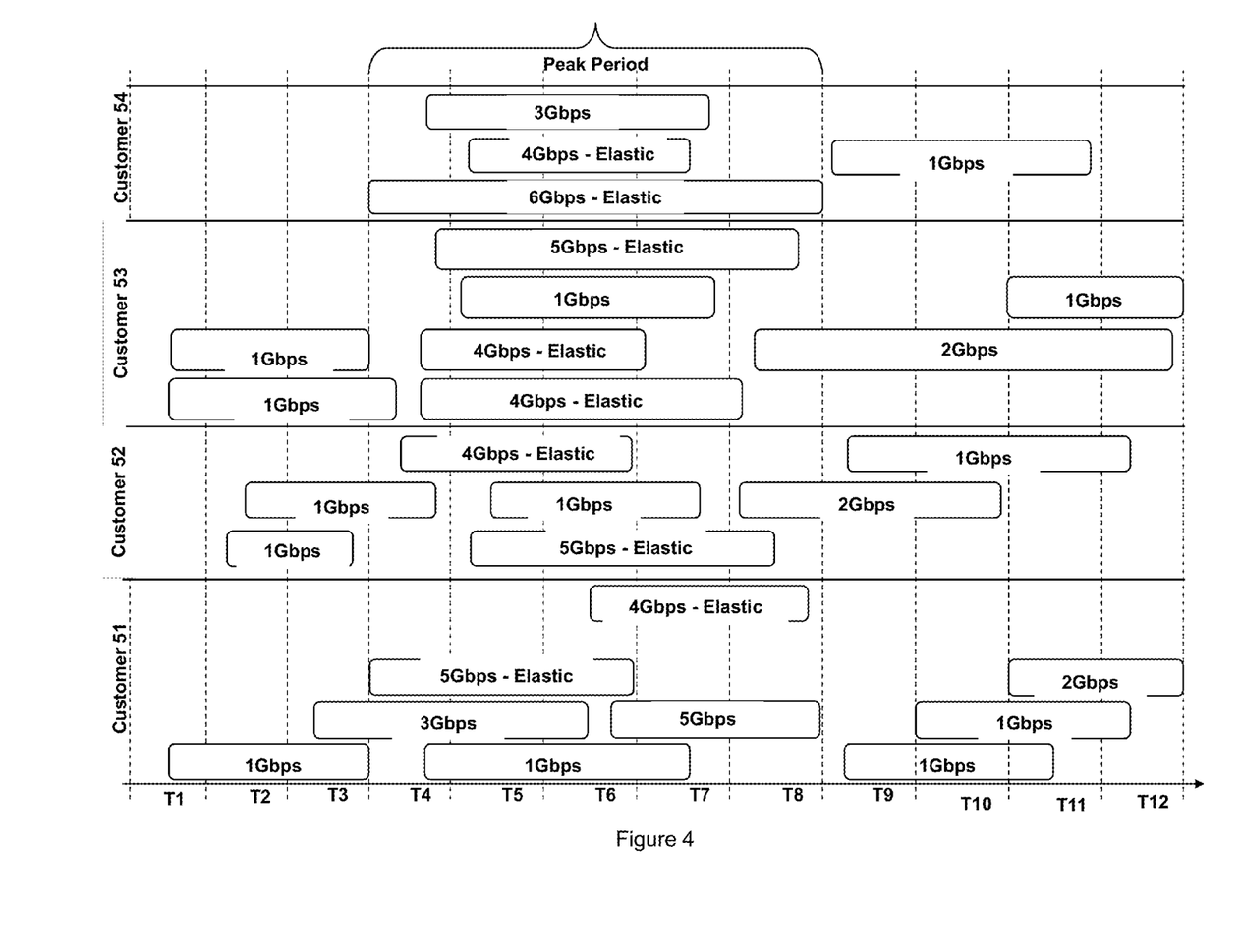
FIG. 4 is a time chart depicting an illustrative set of requests from four customers for the delivery of networked services.

FIG. 4 is a time chart depicting the requests from four customers 51, 52, 53, 54 for the delivery of networked services from the enterprise cloud and datacentre infrastructure 3 in FIG. 3. These requests are assumed to be submitted in advance to the service provider. The prices presented in Table 1.0 are also assumed to have been published in advance to the four customers, and all customers are assumed to have been incentivized by the time-dependent prices offered by the service provider allowing the NRPS 1 to automatically time shift the delivery of networked services for any applications identified by the customers to be time-elastic. These requests are depicted as bandwidth demands for transmission of data in the upstream direction i.e. from customer sites to datacentres, and are each identified as either time-elastic or time-inelastic customer applications. A discrete time model is used for the operating periods of the service provider such that requests from customer applications are grouped into start and end timeslots based on the expected start and end times for networked service delivery.

For the requests shown in FIG. 4, it is clear the peak period falls between timeslots T4 and T8 inclusive when the total demand from client applications for data transmission within this period is 61 Gbps with a peak demand of 55 Gbps in T6. However, the network depicted in FIG. 3 is only able to deliver a total of 30 Gbps across all links in the upstream direction. This is delivered via three end-to-end paths, each delivering 10 Gbps between customers and datacentres i.e. paths A-E, A-C-E, and A-B-D-E. Without such rescheduling, the network may have to block some of the requests from the customer applications.

Figure 7A:
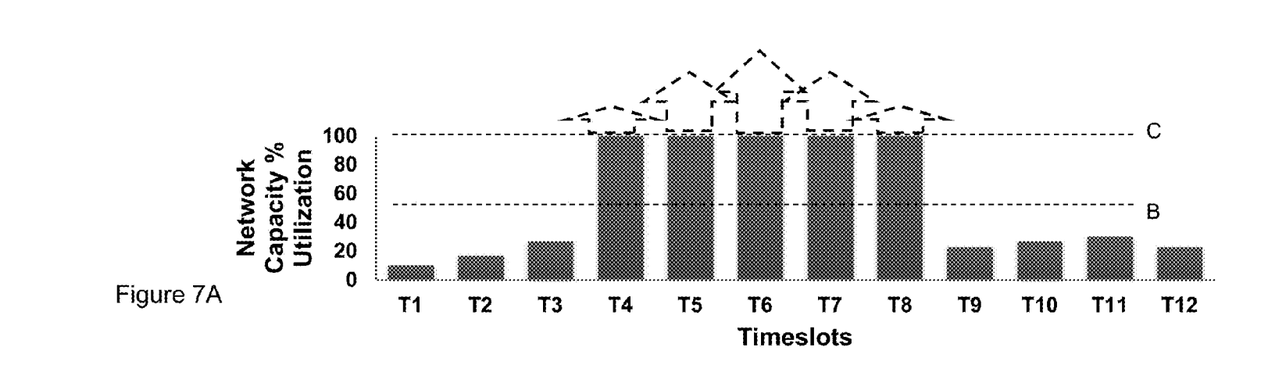
FIG. 7A is a representation of end-to-end network capacity utilization without time shifting.

Timeslots T1-T3 and T9-T12 are relatively low congestion periods for this SP with total service delivery requirements of 8 Gbps (28% of capacity maximum) and 9 Gbps (30%) respectively. FIG. 7A depicts the end-to-end network capacity utilization using the demand figures from FIG. 4.

The network service for timeslots T1-T3 and T9-T12 can be delivered over a single end-to-end path i.e. A-E assuming the paths are provisioned using a Shortest Path First algorithm.

The operating costs, revenue and profits are computed for delivering accepted customer application demands within each of these utilization periods and are presented in Table 2. The operating cost for each utilization period is computed using Equation (1)

$$N \times \Psi \times \Phi \quad (1)$$

The revenue for each utilization period is computed using Equation (2) where β is the total number of Gbps for the network services delivered (i.e. sum of all customer demands with services provisioned by the NRPS 1) during the period and Ω is the usage price per Gbps depending on whether the period is considered to be a high or low utilization period.

$$\beta \times \Omega \quad (2)$$

Figure 8:
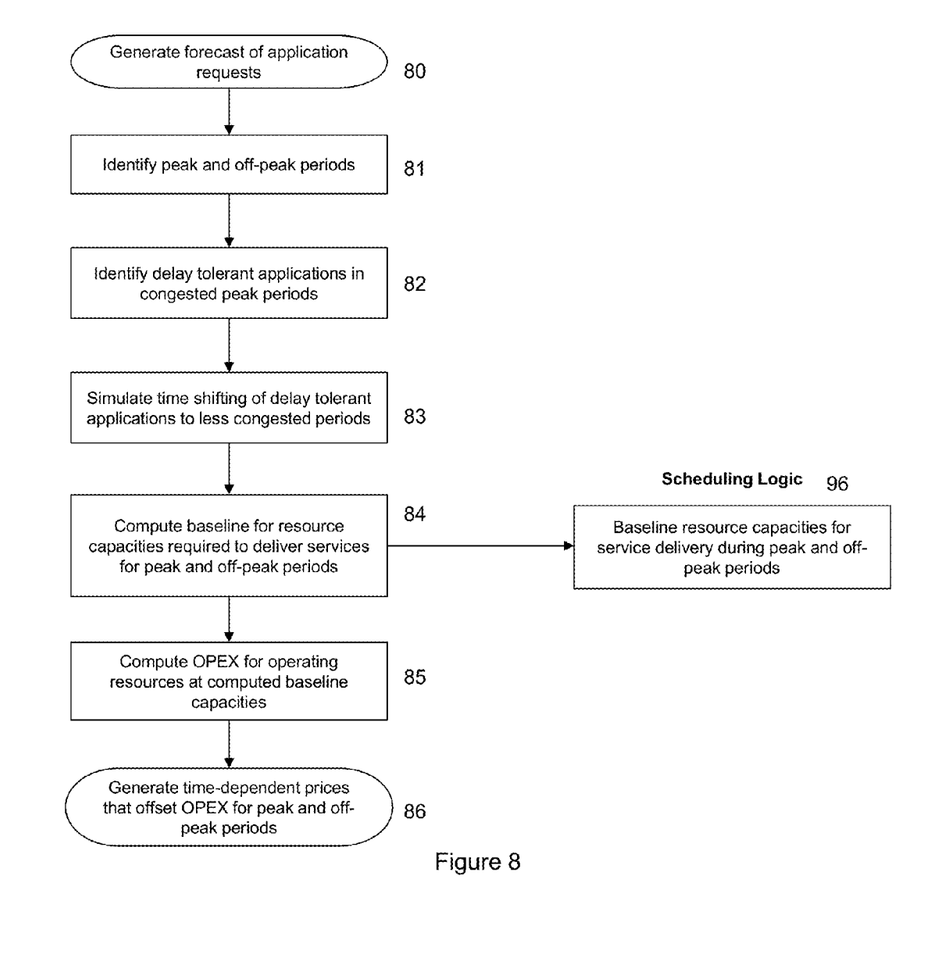
FIG. 8 is a flowchart of a preliminary step in a process for determining initial parameters for use in a subsequent scheduling stage.
Figure 9:
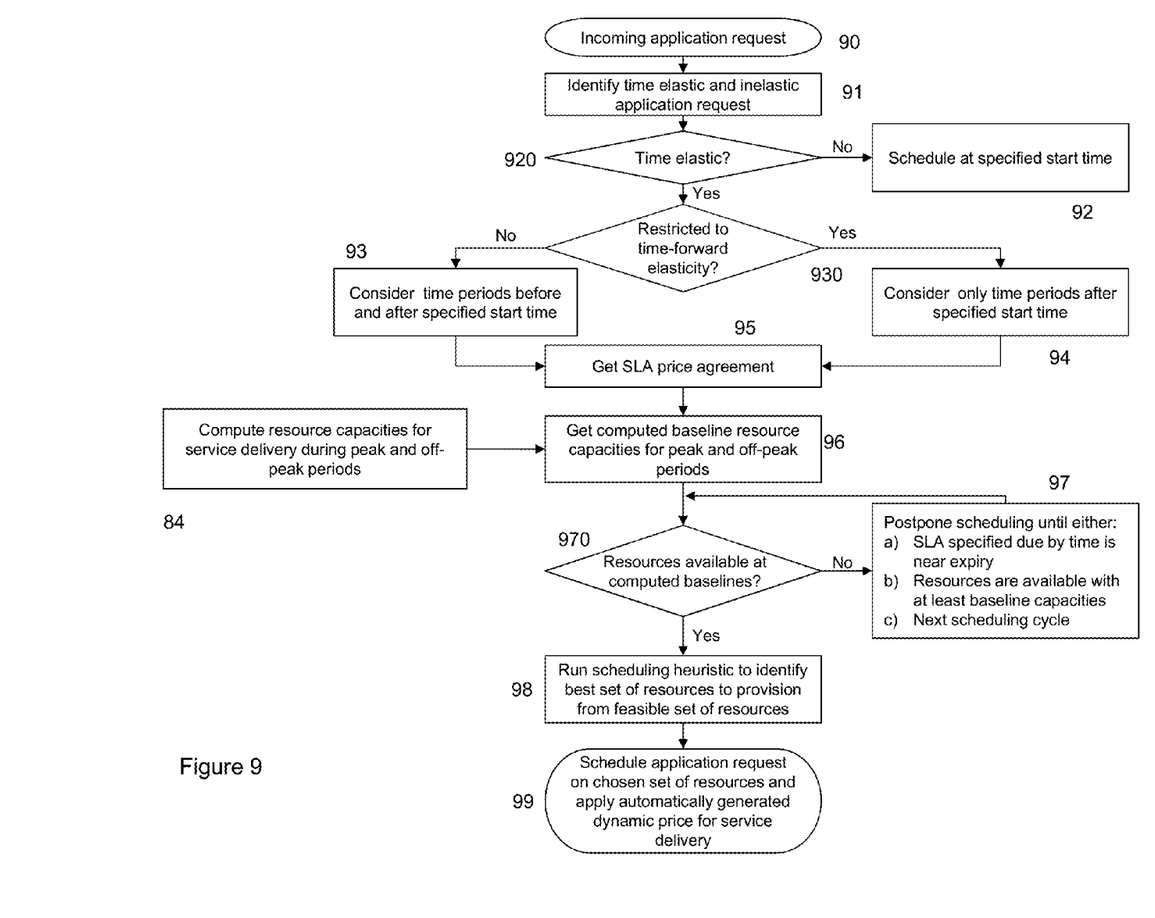
FIG. 9: is a flowchart of the scheduling stage.

FIG. 9 is a flowchart depicting a dynamic scheduling logic for operating a process according to this invention. This process uses data that is generated using a dynamic demand parameter-calculation logic depicted in the flowchart of FIG. 8, and this will be discussed first.

The flow chart of FIG. 8 depicts the process used to generate the parameters determining the resources that need to be made available to meet the overall demand. This logic also determines a time-dependent pricing structure that offsets operating costs for peak and off-peak periods.

In a first step 80, the number and timing of capacity requests is determined. This may be done using known requests or may use historic data using comparable time periods. This will generate a demand profile such as that shown in the time matrix of FIG. 4. This shows the various capacity requests made by four customers 51, 52, 53, 54 for capacity in twelve two-hour timeslots T1, T2 ... T12. Some requests are labelled "elastic" (delay-tolerant, may be time-shifted). The remainder are fixed.

Having identified the requests, peak and off peak periods are identified (step 81). These are defined simply according to whether, for each period, the capacity requested exceeds the capacity available (peak) or the capacity available exceeds the capacity requested (off peak).

FIG. 7A represents a capacity utilisation profile corresponding to the time matrix of FIG. 4. It will be noted that from timeslot T4 to timeslot T8 demand (indicated by the dotted arrowheads) exceeds 100% capacity (30 Gbps), indicated by the line "C" in FIG. 7A, FIG. 7B and FIG. 7C. These are defined as "peak" periods, as indicated in FIG. 4. At other times (timeslots T1 to T3 and & T9 to T12) demand is less than 100% of capacity C. These are defined to be "off-peak" periods. In the example of FIG. 7A, the demand for resources is also less than a baseline resource capacity B, which is the threshold required to operate economically (i.e to cover the cost of operating the resources).

The availability of capacity may be defined in discrete blocks. For example, referring to FIG. 3, each of the three routes has a capacity of 10 Gbps. If the required capacity at a given time is less than 20 GBps, one of the three routes (33% capacity) can be dispensed with for that period, reducing operating or leasing costs, or allowing the nodes on that route to be overhauled. Thus a useful distinction can be made between off peak periods according to how many of the discrete capacity blocks are required to meet the current demand.

In the next step (82) the peak periods (that is, those where demand is in excess of capacity) are examined to identify applications which are delay-tolerant ("elastic"). A simulation programme (step 83) is then run to move these delay-tolerant capacity requests into the off peak periods.

Figure 7B:
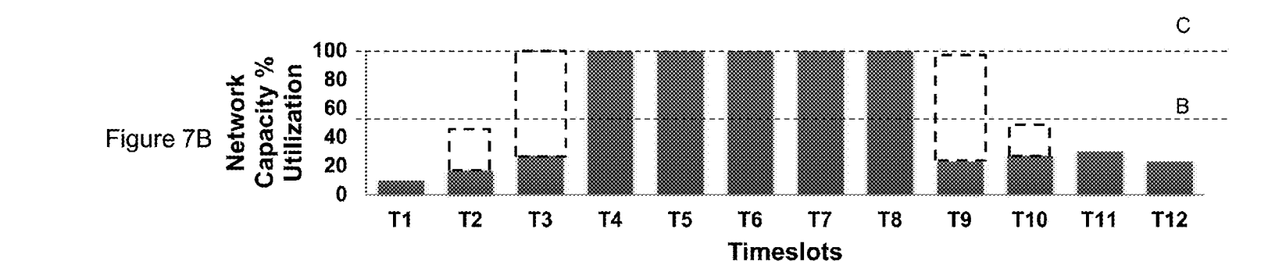
FIG. 7B is a representation of end-to-end network capacity utilization using minimum time shifting.

FIG. 7B shows an arrangement in which peak time demand in excess of capacity has simply been shifted by the minimum necessary to find spare capacity. The dotted blocks indicate the applications that have been moved. It will be seen that utilisation in many of the off peak periods T1, T2, T10, T11 and T12 is still below the baseline resource capacity B.

It will be appreciated that the most efficient use of resources is to time shift capacity requests such that each block of capacity that is required is used to its maximum extent, rather than several blocks of capacity being partially used.

Having attempted one or more simulations the baseline resource capacity B is then determined (step 84). This is the minimum capacity required to meet all the projected demands after possible timeshifts have been taken into account.

This baseline capacity is then used for the actual scheduling process 96, which will now be described with reference to FIG. 9. This baseline capacity can also be used to calculate the operating costs (step 85), and thus the pricing regime that is to be applied for the peak and off-peak periods (step 86) such that the income from pricing exceeds the operating costs. This will be described later.

FIG. 9 is a flow diagram illustrating the scheduling process itself. The process begins with an application for resource to be allocated to a user (step 90). For example, the resource may be computing power, data storage, or network capacity. In the example it is network capacity. The resource is requested for a specific volume (bandwidth) and a specific duration, and with specified time constraints. These time constraints are identified (step 91) and a decision is made (920). If the times are "inelastic"—required at a specific time of day for example for a real-time application—the resource is scheduled for that user at that time (step 92). Alternatively, the scheduling may be "elastic"—able to be scheduled at any time within a specified "window", for example defined by a "due-by" or "not before" time, or both. The constraints are examined (step 930) to determine if the "elasticity" only allows scheduling after a specified time. This would be the case for example if the data to be transmitted will only become available for transmission at a specified time. In such a case the resource can be scheduled to that application at any time after the specified start time: it can only be time-forwarded (delayed)—step 94. If such a constraint is not present, the application can have a resource allocated at any time, before or after the specified start time (step 93).

The next step is to get the pricing structure (step 95) and the baseline resource capacities (step 96) as determined by the process illustrated in FIG. 8.

The process then identifies whether resources are available to meet the current request (step 970). If this is not the case, the request is sidelined (step 97) until one of the following conditions is met:
  a) A specified due-by time approaches expiry: in such a case extra resources are allocated in order to meet the "due-by" time.
  b) Resources become available with at least baseline capacities (this may be due to rescheduling of other applications, or because further resources have been allocated to meet the requirements of condition "a" above in respect of another application)
  c) In the event that neither of those two conditions are met, the request is held over to the next scheduling cycle If resources are available, a scheduling algorithm is then run to identify the best set of resources for time-elastic customer application requests, as is now described in the form of a pseudocode, and depicted diagrammatically in FIG. 10:

---

Figure 10:
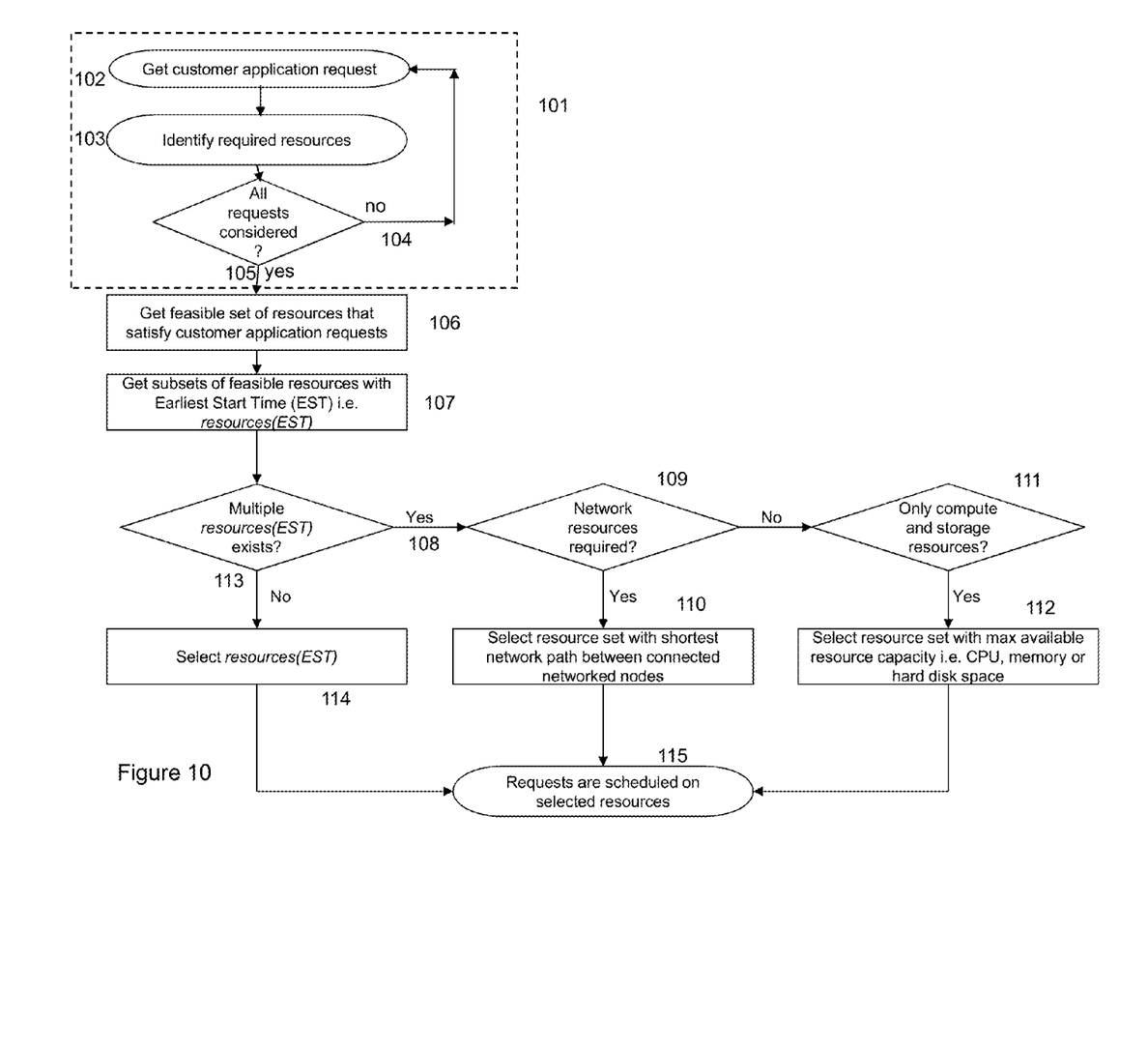
FIG. 10 is a flow chart depicting the scheduling process.

101: loop
102:   $u_r \leftarrow U_r$ - Customer application requests
103:   $_{getResourceSet\ (U_r)}$getResourceSet (Ur)
104: end loop
105: PROCEDURE: getResourceSet (Ur)
106:   get feasible set of resources for customer application requests i.e. feasibleResources$_{feasibleResources}$
107:   get resource sets with earliest start time (EST) (equivalent to closest time shift if applicable) i.e. resources(EST) where resources(EST) is a subset of feasibleResources
108:   if | resources(EST)| > 1 then
109:       if customer application requests require network resources then
110:           select resource set with shortest network path between connected network nodes
111:       if customer application requires only compute or storage resources then
112:           select resource set with max available amount of processing (CPU, memory, etc.) or storage
113: else
114:       select resources(EST)
115: END PROCEDURE - schedule selected resources

---

In summary, the scheduler identifies a resource set that meets the criteria required to satisfy the request (steps 106, 113, 114). If there is more than one such set, the one with the earliest start time is selected (step 107) as it may have passed, and thus be wasted if not used, before later requests are received). Note that this earliest start time (EST) may be after the requested time or, if not restricted to forward (postponed) timeshifting, it may be before the requested time.

If there is more than one resource with the same EST (step 108) then the routing using the shortest network path (fewest hops, or shortest propagation time) is selected (step 109, 110) or, if no network resources are required, the resource set with the largest spare capacity meeting quality criteria specified for the requested application, such as data loss rate or latency, is selected (step 111, 112)

Figure 5:
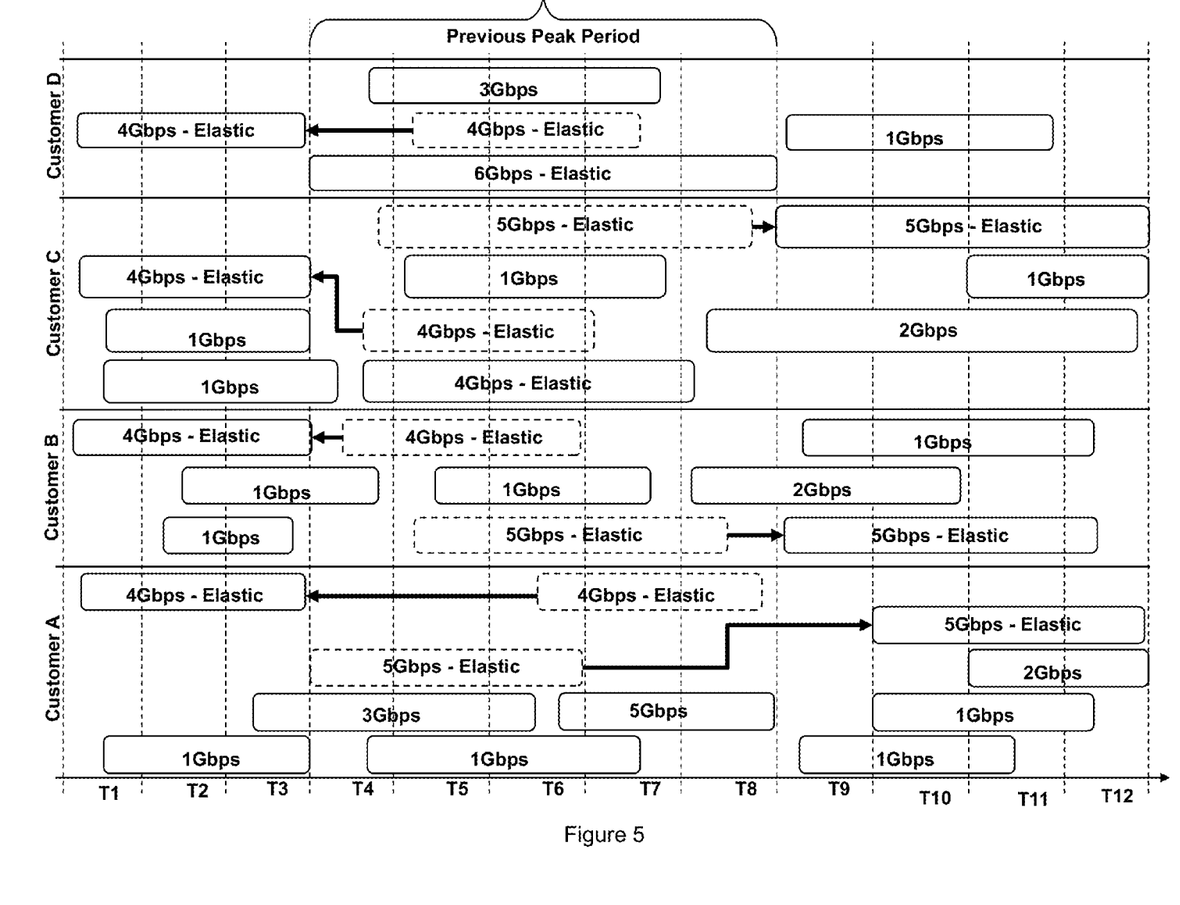
FIG. 5 is a time chart depicting the timeshifting of delay-tolerant customer application demands.
Figure 6:
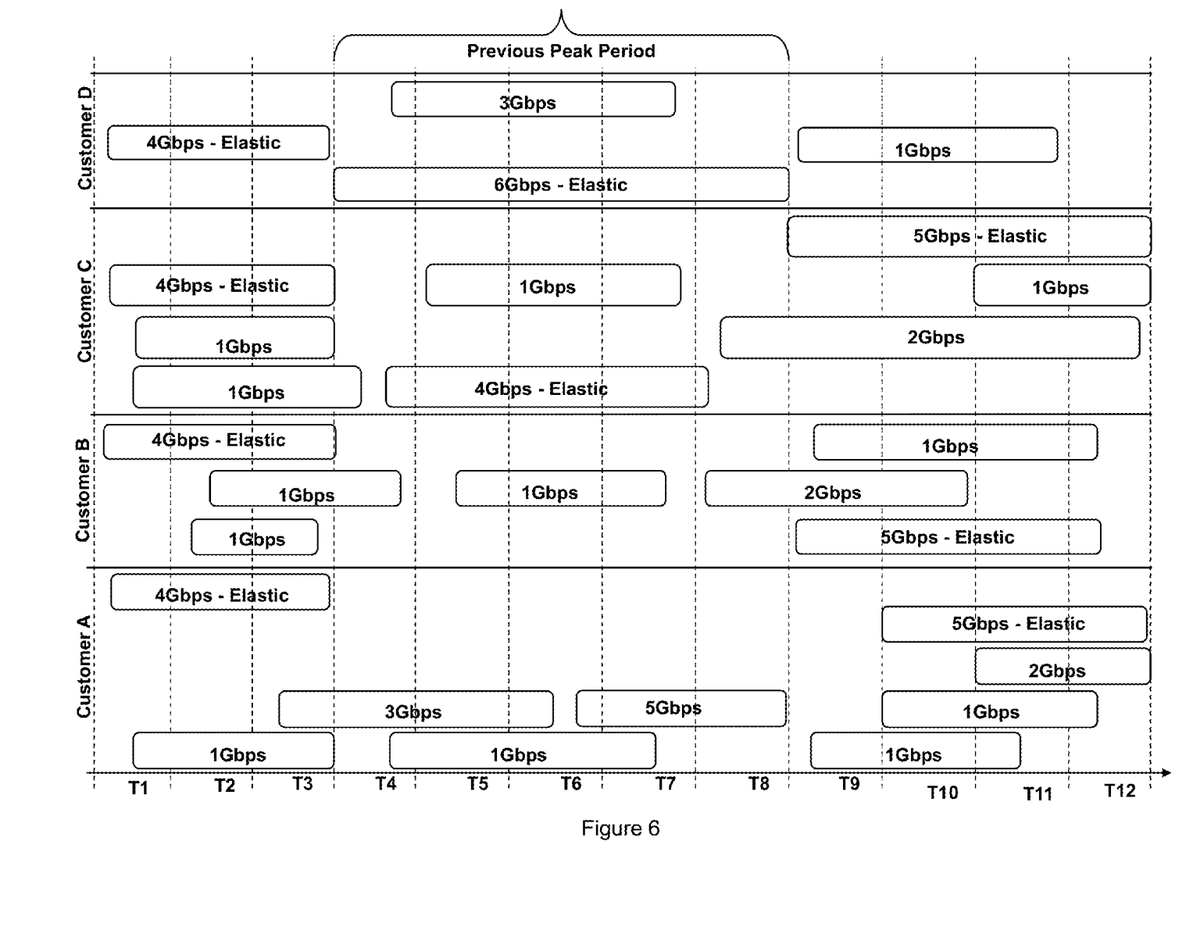
FIG. 6 is a time chart depicting modified service delivery times following the time shifting of delay-tolerant customer application demands.
Figure 7C:
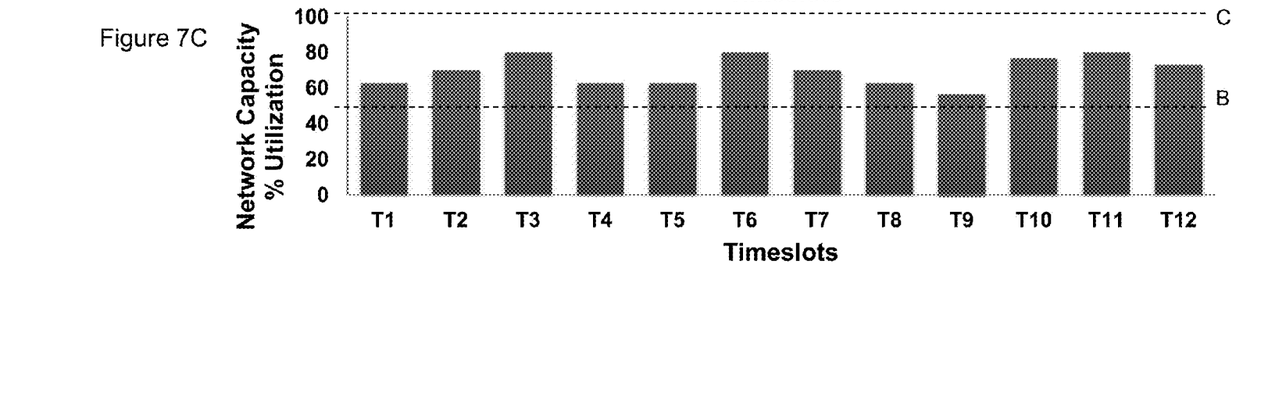
FIG. 7C is a representation of end-to-end network capacity utilization using a time shifting process according to the invention.

The time-shifting process is illustrated in FIG. 5, and the outcome in FIG. 6. More than one time shifting arrangement may be tested, to determine which is the optimum. FIG. 7C represents a capacity utilisation profile corresponding to the time matrix of FIG. 6. It will be seen that demand is consistently maintained at a level between 60% and 80% of maximum capacity. This is an efficient use of resources, as it allows 20% of capacity to be dispensed with, allowing maintenance of that capacity, or avoiding the cost of leasing it.

FIG. 6 shows the modified service delivery times following the time shifting of delay tolerant customer application demands by the NRPS. Automated adjusted of demands from customer applications based on time-dependent pricing The end-to-end resource capacity utilization in the upstream direction for delivering the demands presented in FIGS. 4, 5 and 6 are shown in FIGS. 7A, 7B and 7C respectively. The values used to plot these graphs were computed using Equation (3). These graphs show how this process enables service providers to increase revenue and also enables more effective and efficient resource utilization over traditional peak and off-peak periods. In addition, service providers will be able to reduce blocking (non-fulfilment) of requests from customer applications, and avoid the delivery of networked services with low quality of service scores during peak periods.

$$\frac{\text{Total service delivered in timeslot}}{\text{Total capacity available in upstream end-to-end paths}} \times 100 \quad (3)$$

The example scenario presented has been simplified to demonstrate the principle of this invention. A typical deployment would consider more complex parameters and generate more complex forecast, pricing and operating costs-aware schedules for the placement of customer demands on compute and storage servers, and the provisioning of network paths in enterprise cloud and datacentre infrastructures.

The baseline resource capacity determined in step 84 (FIG. 8) can be used to determine pricing for the period in question as follows.

$$\max_{p_i, \forall i=1\ldots m} R = \sum_{i=1}^{m} d_i(p_i - c_i) \quad (4)$$

In Equation (4), R is the total revenue, m is the number of periods in a planning cycle. In this example M=12, each period being two hours, to allow for time shifting between peak and off peak periods within one day.

$p_i$ is the suggested price for the ith period, $d_i$ is the forecast number of application requests for ith period, and $c_i$ is the operating costs associated with ith period. The task is to find a set of prices, $p_i$ for each period, such that it offsets operating costs $c_i$ for that period, and maximises the total revenue R.

Equation (4) is further constrained with lower and upper bounds for price and application demand; these constraints are mathematically represented by Equations (5) and (6) respectively.

$$\underline{p}_i \leq p_i \leq \overline{p}_i, \text{ For all } i=1 \ldots m \quad (5)$$

$$\underline{d}_i \leq d_i \leq \overline{d}_i, \text{ For all } i=1 \ldots m \quad (6)$$

Where $\overline{p}_i$ and $\underline{p}$ are the lower and upper bound for price $p_i$, and $\underline{d}_i$ and $\overline{d}_i$ are the lower and upper bound for expected demand $d_i$. The upper bound of the price is a maximum price agreed with customers whilst the lower bound is set to cover the operating costs. Similarly, the upper and lower bounds to the application demand are determined by the maximum capacity of available resources in the networked infrastructure and the minimum traffic necessary to offset the operating costs.

Further to these equations, demand for a period i depends on the price for that product in that period and is mathematically represented by a linear demand model presented in Equation (7).

$$d_i = D_i + \Sigma_{j=1}^{m} a_{ij} p_j \quad (7)$$

Where $D_i$ is the base demand, i.e. the amount of demand in the case of cheapest price, and $a_{ij}$ is a price sensitivity parameter calculated from the historical data which models the effect of price for period j with demand for period i. From (4) and (7), a dynamic pricing model is created as a function of price and demand for a given period as shown in Equation (8).

$$\max_{p_i, \forall i=1\ldots m} R = \sum_{i=1}^{m} \left( D_i + \sum_{j=1}^{m} a_{ij} p_j \right)(p_i - c_i) \quad (8)$$

The computation of Equation (8) results in a set of time-dependent prices that offset operating costs for the 24-hour operating periods.

The updated operating costs, revenue, and profits for the SP are computed with this invention and are presented in Table 2. This table shows the use of time-dependent pricing coupled with the time shifting of networked service delivery for delay tolerant customer applications is able to generate increased revenue and profits. In the example scenario presented in FIG. 3, this invention allows the SP provision networked services for all requests from customer applications following the automated time shifting of networked service delivery times. In this case, the process automatically allocates bandwidth close to the maximum resource capacities on the end-to-end paths thereby satisfying the constraints for minimum provisioned resource capacities to deliver networked services that generate sufficient revenue to offset operating costs during less congested periods.

TABLE 2

| | Without time shift | | | |
|---|---|---|---|---|
| Timeslots | T1-T3 (off-peak) | T4-T8 (peak) | T9-T12 (off-peak) | Total |
| Provisioned Paths | A-E | A-E, A-C-E, A-B-D-E | A-E, A-C-E | |
| Total Services Delivered | 8 Gbps | 30 Gbps | 11 Gbps | Average 16 Gbps |
| operating costs | 2.70 | 11.25 | 5.40 | 19.35 |
| Revenue | 5.20 | 28.50 | 7.15 | 40.85 |
| Operating surplus | 2.50 | 17.25 | 1.75 | 21.5 |
| | With time shift | | | |
| Provisioned Paths | A-E, A-C-E, A-B-D-E | A-E, A-C-E, A-B-D-E | A-E, A-C-E, A-B-D-E | |
| Total Services Delivered | 24 Gbps | 30 Gbps | 26 Gbps | Average 27 GBps |
| operating costs | 6.75 | 11.25 | 9.00 | 27 |
| Revenue | 15.60 | 28.50 | 17.25 | 61 |
| Operating surplus | 8.85 | 16.90 | 7.90 | 34 |

Table 2 compares the total operating costs, revenue and profits to deliver networked services for accepted customer application demands over the timeslots considered in FIG. 4 with the same properties when reallocated as shown in FIG. 6. However, the operation of the timeshifting time elastic customer applications allows increased resource utilization during off-peak periods, and intelligent scheduling of demands from customer applications.

It will be noted that better use is made of the resources in the off peak period, and that the average volume of service that is delivered is over 60% greater with time shifting in operation. More efficient use is made of the off-peak resources, as although more of them are used (hence the greater operating cost figures off peak), they are running at close to full capacity.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A process for scheduling the allocation of resources to applications in response to requests for use of the resources by the applications, the requests including inelastic requests specified for performance at a specific time slot, and elastic requests specified for performance within a predetermined time range comprising one or more of a set of time slots, and resources being capable of allocation in predetermined blocks, characterised in that for each of the set of time slots a baseline resource capacity is determined, being the minimum block of capacity that
   can be allocated that is efficient to meet inelastic requests specified for performance within that time slot, and the elastic requests are allocated for performance such that the total capacity allocated is maintained at least as great as the baseline capacity, in which the baseline capacity is determined by calculation of the minimum resources projected to be required to meet the requests in a predetermined period when averaged over that period.

2. The process according to claim 1 wherein each request is identified as to whether the respective predetermined time range falls partially within a period where the total volume of requested capacity does not exceed the capacity available, and allocating the application to resources for use during that period.

3. The process according to claim 1 wherein each request is allocated resources at the earliest point in its requested time range at which the other conditions of allocation are met.

4. The process according to claim 1 wherein the resources to be allocated include telecommunications network capacity.

5. The process according to claim 4, wherein the allocation process assigns the shortest available network path to the application.

6. The process according to claim 1 wherein the resources to be allocated include data storage capacity.

7. The process according to claim 1 wherein the resources to be allocated include computational capacity.

8. A resource provisioning system comprising a scheduler arranged to perform the steps defined in claim 1.

9. The resource provisioning system according to claim 8, further comprising a forecasting engine configured to generate a value for the baseline resource capacity to be used by the scheduler.

10. The resource provisioning system according to claim 8 further comprising a utilisation repository for storing data generated by the scheduler, and to be used by the forecasting engine.

11. The resource provisioning system according to claim 8 further comprising a resource pricing system arranged to assign a value to each request, the value being associated with the resources required to meet each request relative to the baseline resource capacity.

12. The resource provisioning system according to claim 8, comprising a scheduler arranged to perform the steps in accordance with claim 1.

13. The resource provisioning system according to claim 8, comprising a scheduler arranged to perform the steps in accordance with claim 2.

14. The resource provisioning system according to claim 8, comprising a scheduler arranged to perform the steps in accordance with claim 3.

15. The resource provisioning system according to claim 8, comprising a scheduler arranged to perform the steps in accordance with claim 4.

16. The resource provisioning system according to claim 8, comprising a scheduler arranged to perform the steps in accordance with claim 5.

17. The resource provisioning system according to claim 8, comprising a scheduler arranged to perform the steps in accordance with claim 6.

18. The resource provisioning system according to claim 8, comprising a scheduler arranged to perform the steps in accordance with claim 7.

19. The resource provisioning system according to claim 8, comprising a scheduler arranged to perform the steps in accordance with claim 1; further comprising a forecasting engine configured to generate a value for the baseline resource capacity to be used by the scheduler; further comprising a utilisation repository for storing data generated by the scheduler, and to be used by the forecasting engine; and further comprising a resource pricing system arranged to assign a value to each request, the value being associated with the resources required to meet each request relative to the baseline resource capacity.

* * * * *